United States Patent [19]
Roszkowski

[11] 3,785,336
[45] Jan. 15, 1974

[54] TEMPERATURE INDICATOR

[75] Inventor: Gregory J. Roszkowski, Arcadia, Calif.

[73] Assignee: Bio-Medical Sciences, Inc., Fairfield, N.J.

[22] Filed: July 1, 1971

[21] Appl. No.: 158,946

[52] U.S. Cl. .................... 116/114.5, 73/356, 73/358
[51] Int. Cl. ............................................. G01k 11/06
[58] Field of Search ............................ 73/356, 358; 116/114.5

[56] References Cited
UNITED STATES PATENTS

| | | | |
|---|---|---|---|
| 3,324,723 | 6/1967 | Ritchie | 73/358 |
| 3,430,491 | 3/1969 | Gignilliat | 73/356 |
| 3,002,385 | 10/1961 | Wahl | 73/358 |

FOREIGN PATENTS OR APPLICATIONS 889,573  2/1962  Great Britain

*Primary Examiner*—Richard C. Queisser
*Assistant Examiner*—Denis E. Corr
*Attorney*—Eric H. Waters et al.

[57] ABSTRACT

A temperature indicator to determine if a patient's temperature is above normal or feverish comprises an elongated body having a gob-like coating on one end which has a contrasting color relative to the body and which will melt at a temperature slightly above the accepted normal of 98.6° F.

7 Claims, 6 Drawing Figures

PATENTED JAN 15 1974 3,785,336

TEMPERATURE INDICATOR

BRIEF SUMMARY OF THE INVENTION

The invention relates to temperature indicators and particularly to indicators which are used to determine if a patient's temperature varies from normal.

In many instances the precise temperature of the patient is not as pertinent to the diagnosis as the initial determination of whether or not a patient is feverish. Once having determined that a patient is feverish, other accepted methods of temperature taking may be used to determine the patient's exact temperature if this is desired. Moreover in many instances at home, the fact that a patient is feverish is sufficient basis for referral of the patient to a physician.

Accordingly it is desirable to have an inexpensive and quick means of determining if a patient's temperature varies from the accepted normal of 98.6° F. Since such a device has application both in the hospital and at home it is further desirable that the device may be conveniently used and read by a lay person as well as a medical technician.

An object of the present invention is to provide a new and improved temperature indicator which will furnish a quick and inexpensive way of determining if a patient's temperature varies from the accepted normal.

Another object of the present invention is to provide a temperature indicator which may conveniently be used and interpreted by a lay person as well as by a medical technician.

In accordance with the above and other objects there is provided an improved temperature indicator having the general shape and appearance of a household match and including an elongated body of match shape defining a handle. A coating in the form of an encapsulation gob of material is provided at one end or tip of the body with a color contrasting to that of the tip, and the material has a melting temperature slightly different from the accepted normal. In a preferred embodiment the coating may consist of methyl stearate refined to have a melting temperature slightly above 98.6° F. In use, the coated end of the temperature indicator is placed in the patient's mouth, and if the patient is feverish the coating will melt exposing the contrasting color of the indicator tip.

Of course suitable variation can be made in the temperature sensitive coating when the thermometer is intended for use other than in the patient's mouth, such as rectally or under the arms.

The indicator may be provided with a plurality of superposed coatings having successive melting points and different colors to indicate temperature ranges such as below normal, and different ranges of fever.

The match-like body may be absorbent of the coating when the latter is molten, and a non-absorbent transparent layer may cover the coating to permit observation of the state of the coating while preventing ingestion of the coating. Of course, irrespective of the presence of the transparent layer, the coating must be harmless if ingested and should not be unpleasant to the taste. A suitable coating material is methyl stearate.

The match like bodies can be held in separated, removable fashion in a support which may take the form of a conventional match book in order to facilitate storage and use.

For a better understanding of the present invention reference is made to the accompanying drawing.

DETAILED DESCRIPTION

Figure 1:
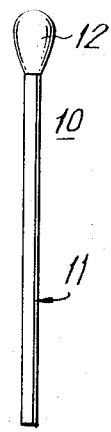
FIG. 1 is an elevation view of a temperature indicator according to the present invention.
Figure 2:
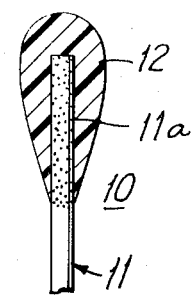
FIG. 2 is a cross sectional view of an end portion of the temperature indicator of FIG. 1.

Referring now to the drawing, and particularly to the embodiment of FIGS. 1 and 2, there is illustrated a temperature indicator 10 according to the present invention and including an elongated body or stick 11 which may be a wooden stick of much the same shape as a wooden kitchen match. The body 11, or at least one end or tip 11a thereof, is of a distinctive color. The color may be obtained, if desired, by dipping the end 11a of the body into a vegetable dye of a bright and contrasting color such as red. When dry, the dyed end 11a of the body 11 is then dipped into a batch of colored temperature sensitive coating 12 having a contrasting color relative to the end 11a of the body and a melting temperature slightly above the accepted body normal of 98.6° F.

One suitable coating material for the coating 12 is methyl stearate since the exact melting temperature of this compound may be accurately controlled through the use of zone purification to achieve the desired purity or melting point. Moreover methyl stearate has been recognized as non-toxic by the Federal Food and Drug Administration of the United States of America. Other suitable chemicals or compounds may be chosen from those listed in U.S. Pat. No. 3,430,491.

In its pure form methyl stearate is white and opaque so that when it has dried on the colored end 11a of the body 11 it will completely conceal the colored portion.

The temperature sensitive material is in the form of a gob at the end of the body 11 to insure accuracy of measurement by utilization of a sufficient quantity of temperature sensitive material. Furthermore, the presence of the gob will exclude premature melting, as might be obtained with an isolated thin coating on one side of the body. Also the gob furnishes suitable covering of the end of the body and minimizes scratching or other mechanical action which might expose the end 11a of the body if a thin coating were used. Additionally, since the gob encapsulates the entire end of the body 11a, protection is afforded against injury due to accidental poking with the end. Furthermore, the encapsulation of the end with the distinctive color of the gob alerts the user to this end and signifies the need for care in somewhat the same manner as a conventional mercury bulb.

In use, the temperature indicator 11 is simply inserted into the patient's mouth with the color sensitive coating 12 placed under the patient's tongue in the accepted manner for a clinical thermometer. After approximately 20 seconds the temperature indicator may be removed and observed. If the patient's temperature is normal, or below, the heat in his mouth will not have been adequate to melt or dissolve the coating 12 so that the end of the indicator will remain white. However if the patient is feverish, the methyl stearate coating 12 will melt and the reddened end portion 11a of the body will become visible.

A more dramatic readout may be provided by coloring the coating material 12 with suitable dye of a contrasting color to the colored end 11a of the body. For example, the coating 12 could be dyed green so that when a fever is present the indicator will change color from green to red.

Figure 3:
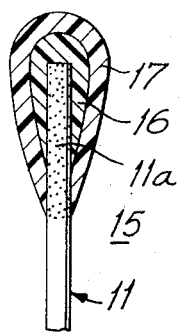
FIG. 3 is a cross sectional view of a temperature indicator according to another embodiment of the present invention.

Another form of this invention can be arranged to provide two, and possibly more readouts, in the manner illustrated in FIG. 3. As therein illustrated there is provided a temperature indicator 15 formed with a body 11 having a colored end 11a. The colored end 11a of the body is first dipped in a solution of methyl stearate having a melting point of approximately 99 degrees Fahrenheit to provide a first coating 16. This intermediary coating can be left in its white opaque form, if desired, or could be dyed with a third contrasting color such as yellow. The intermediary solution when dry is then dipped into a second solution of methyl stearate having a melting point below normal, or approximately 98 degrees Fahrenheit, to provide a second coating 17. This second coating 17 can be dyed, if desired, for example, green.

In use, if the patient's temperature is below normal the temperature indicator will show green. If the patient's temperature is normal, the green methyl stearate coating 17 will melt and the intermediate coating 16 will remain on the body of the indicator and show the yellow color. If feverish, both solutions of methyl stearate will melt and the reddened end 11a of the temperature indicator will show through.

In use, of course, the body 11 of the temperature indicator should be long enough to provide a handle for use as a thermometer and assure the user that his hands will not come into contact with the portion that is inserted into the patient's mouth.

Figure 4:
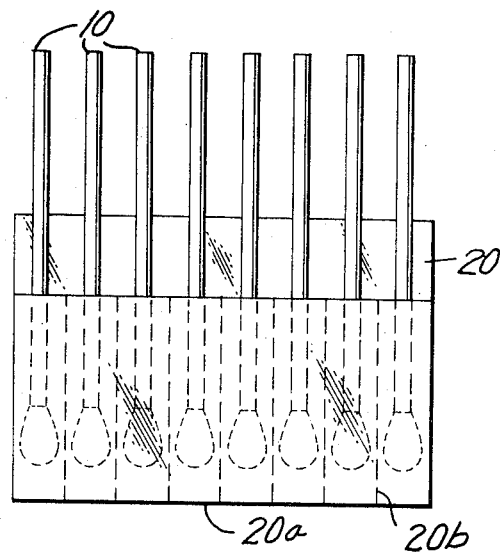
FIG. 4 is an elevation view of a package of indicators according to the present invention.

Match type temperature indicators can be packaged in a number of different ways to assure the user that the unused indicators remain in a clean and aseptic condition. Thus, for example, the treated ends of a series of sticks or indicators (FIG. 4) can each be inserted in a sheet 20 folded over as at 20a and interconnected between sticks as at 20b to form a plurality of individual pockets to hold the coated ends of the temperature indicators in separated removable relation. Thus each temperature indicator 10 is kept out of contact with the other temperature indicators in the packaged series and the portion of the temperature indicator that is to be placed in the patient's mouth is inside the sealed or foldedover portion of the container. The sheet 20 may conveniently be made of polyethylene film to provide for heat forming of the seals 20b and formation of the individual pockets.

Figure 5:
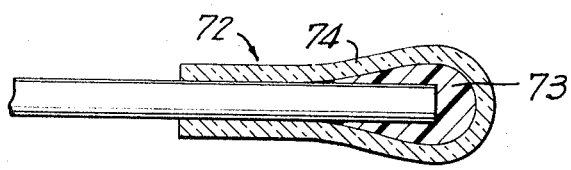
FIG. 5 is a sectional view of an indicator according to another embodiment of the invention.
Figure 6:
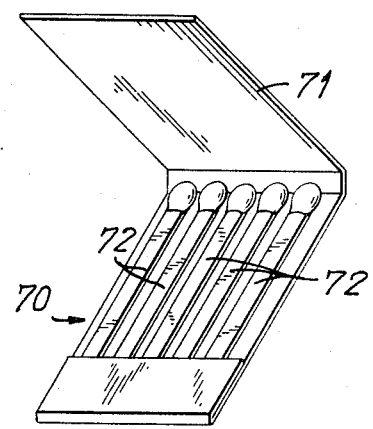
FIG. 6 is a perspective view of another embodiment of package for the indicators of FIG. 5.

FIG. 5 illustrates another embodiment of a temperature indicator 70. In this embodiment the bodies 72 of the indicators resemble a conventional paper match and they are packaged in aligned array in a conventional match book 71. The body 72 is punched from absorbent material of a bright color such as red, black, blue, etc. The tip of the body is covered with the temperature sensitive material 73 as previously described in the earlier embodiment. The temperature sensitive material 73 will melt and become absorbed by the body 72 and thus produce the readout. The temperature sensitive material and tip are coated with a transparent plastic layer 74 allowing the colors to be seen and not reacting with the chemicals. The plastic layer is non-absorbent of the molten temperature sensitive material and may, for example, be Mylar or the like.

In manufacturing, methods similar to those used in the manufacture of matches can be used with small deviations. The body 72 is punched out and cooled to a very low temperature, then dipped in the molten temperature sensitive material which is at a temperature slightly above melting temperature. The temperature sensitive material will solidify on the body and form a gob therein before it has a chance to become absorbed by the body. If the body is black and the chemical is white, then the appearance will be that of a black match with a white head. Another "dipping" of the coated body in the plastic material will provide the protective outer layer sealing out the environment. When the "match" is exposed to feverish body temperature, the temperature sensitive material will melt and become absorbed by the body 72 thus changing the appearance thereof from black with a white head to an all black body. Of course, other variations in color and appearance may be employed without departing from the invention.

Temperature indicators of the described form are advantageous in clinical procedures. As contemplated, each temperature indicator is used only once, so that there is no cross contamination between patients after initial use. Of course if the coating remains inert, the indicator could be reused, but instructions could be provided to break the indicator in half after use.

A readout with the indicators according to the invention is obtained in approximately one-ninth the time necessary for a standard clincal thermometer to record the temperature. The indicator does not contain any glass or mercury or other dangerous components as does the conventional mercury thermometer.

The temperature indicator also provides hospitals with an inexpensive, safe and quick means of taking patients' temperatures, as is done three times a day as a matter of routine, and minimizes such things as alcohol jars and other equipment which is required to maintain and sterilize the mercury thermometers. Again as previously noted, if the temperature indicator, shows the patient's temperature to be feverish, the patient's exact temperature could be taken with the clinical mercury thermometer or other accepted means for determining the precise temperature.

Although the present invention has been described by reference to several embodiments thereof, it will be apparent that numerous modifications and variations will become apparent to those skilled in the art without departing from the spirit and scope of the invention as defined in the appended claims.

What is claimed is:

1. A temperature indicator comprising an elongated body constituting a handle for said indicator, said body having opposite ends, and coating means in the form of a gob of material encapsulating one end of said body to cover the same and having a contrasting color relative to said one end of said body, said gob of material having an outer surface which is exposed and uncovered, said gob of material being composed of a non-toxic material having a melting temperature slightly above 98.6°

Fahrenheit so that the indicator can be utilized orally and when the gob of material melts, said gob of material will dissolve away and no longer cover the end of the body whereby the contrasting color of said end of the body will be exposed to indicate the presence of a temperature higher than the melting temperature of said gob of material, said handle being non-absorbent of said gob of material.

2. A temperature indicator as claimed in claim 1, comprising a support means for a plurality of said bodies, said support means holding the bodies in separate, removable relation, each of said bodies being a thin, flat member, said support means being constituted as a folded cover holding said member in an aligned array in the manner of matches in a match book.

3. A temperature indicator as claimed in claim 1, wherein said coating means is methyl stearate.

4. A temperature indicator comprising an elongated body constituting a handle for said indicator, said body having opposite ends, a first coating means in the form of a gob of material encapsulating one end of said body to cover the same and having a contrasting color relative to said one end of said body, said gob of material having a melting temperature slightly above 98.6° Fahrenheit so that when the indicator is utilized and the gob of material melts, said gob of material will dissolve away and no longer cover the end of the body whereby the contrasting color of said end of the body will be exposed to indicate the presence of a temperature higher than the melting temperature of said gob of material, and a second coating means on and covering the first said coating means and having an outer surface which is exposed and uncovered, the second coating means having a contrasting color relative to the first coating means and relative to said one end of the body, said second coating means having a melting temperature slightly different than the melting temperature of the first coating means.

5. A temperature indicator as claimed in claim 4, wherein said one end of the body has a contrasting color compared to the rest of the body.

6. A temperature indicator as claimed in claim 4, wherein said second coating means has a melting temperature below 98.6°F.

7. A temperature indicator as claimed in claim 4, wherein said second coating means has a melting temperature slightly lower than the first melting temperature but above 98.6°F.

* * * * *